United States Patent [19]
Wirbel et al.

[11] Patent Number: 5,074,599
[45] Date of Patent: Dec. 24, 1991

[54] TUBE FITTING

[75] Inventors: Stephen R. Wirbel, Euclid; Joseph M. Stenger, Aurora; Lonnie E. Johnston, Bedford; Appasaheb T. Patil, Hudson; Richard F. Wozniak, Euclid; Peter C. Williams, Cleveland Heights, all of Ohio

[73] Assignee: Crawford Fitting Co., Solon, Ohio

[21] Appl. No.: 605,923

[22] Filed: Oct. 30, 1990

[51] Int. Cl.$^5$ .............................................. F16L 21/04
[52] U.S. Cl. ..................................... 285/93; 285/423; 285/343; 285/354; 285/382.7; 285/541
[58] Field of Search ................. 285/341, 382.7, 423, 285/354, 343, 93

[56] References Cited
U.S. PATENT DOCUMENTS

| | | | |
|---|---|---|---|
| 2,484,815 | 10/1949 | Crawford | 285/382.7 X |
| 3,103,373 | 9/1963 | Lennon et al. | 285/382.7 X |
| 3,402,949 | 9/1968 | Mahoney | 285/341 |
| 3,445,128 | 5/1969 | Teeters | 285/341 |
| 3,584,900 | 6/1971 | Lennon | 285/382.7 X |
| 3,695,647 | 10/1972 | Pugliese | 284/341 |
| 3,708,186 | 1/1973 | Takagi et al. | 285/382.7 X |
| 4,076,286 | 2/1978 | Spontelli | 285/341 |
| 4,500,118 | 2/1985 | Blenkush | 285/423 X |
| 4,799,717 | 1/1989 | Kingsford | 285/341 |
| 4,826,218 | 5/1989 | Zahuranec | 285/382.7 X |
| 4,871,196 | 10/1989 | Kingsford | 285/423 X |

FOREIGN PATENT DOCUMENTS 0444002 3/1936 United Kingdom ................ 285/341

*Primary Examiner*—Dave W. Arola
*Assistant Examiner*—Carol I. Bordas
*Attorney, Agent, or Firm*—Fay, Sharpe, Beall, Fagan, Minnich & McKee

[57] ABSTRACT

A tube fitting for joining resinous plastic tubing comprises a fitting body having an opening with a conically shaped camming mouth. A tube extends into the opening. A first ferrule is slidably received on the tube and has an exterior surface which faces the camming mouth. A second ferrule is also slidably received on the tube at a location outwardly of the opening and the first ferrule. The second ferrule has a nose portion which engages the first ferrule adjacent the tube and is snap fitted within a recess formed circumferentially of the tube prior to association of the tube with the fitting. The nose portion of the second ferrule is engaged in the recess in axial driving engagement with the tube prior to make-up of said fitting. A nut member is threadedly engaged with the body for driving the first and second ferrules into the camming mouth during fitting make-up.

8 Claims, 2 Drawing Sheets

TUBE FITTING

BACKGROUND OF THE INVENTION

The subject invention is directed toward the art of tube fittings and, more particularly, to a tube fitting particularly suited for use with resinous plastic tubing having a high degree of lubricity.

Although it is possible to use standard metal tube fittings for joining plastic tubing, the results achieved are generally somewhat less than desirable. In particular, the relatively high lubricity of the plastic tubing makes it difficult to grip and hold the tubing within the fitting. In addition, when it is desired to have a full, plastic system wherein the fittings are also plastic, the gripping problems are further compounded.

Prior attempts at providing plastic fittings and fittings particularly suited for plastic tubing have taken a variety of different approaches. Often, to generate sufficient gripping forces and prevent tubing collapse, toothed collars and internal tubing sleeves have been used separately or in combination. The internal sleeve approach is undesirable since it tends to reduce the available flow area. Similarly, the toothed collars or ferrules often result in significant deformation and/or damage to the tubing.

Another approach which has been used, comprises driving a tapered, split ferrule into a tapered cam mouth formed about a tube receiving opening in a fitting body. With this prior arrangement there is no ready way to determine when the fitting is properly made-up or to prevent tubing collapse due to over tightening.

Many other fitting designs have been proposed for resinous plastic tube but they have generally suffered from one or more of the noted problems.

The subject invention provides a tube fitting wherein the problems discussed above are overcome and secure gripping and holding of the tube is achieved with a simple and efficient structure. The invention is such that it can be used for either metal or plastic tubing. Likewise, for certain uses and environments the fitting itself can be formed from either metal or plastic.

SUMMARY OF THE INVENTION

In accordance with the subject invention, a tube fitting particularly suited for joining resinous plastic tubing is provided and comprises a fitting body having a flow passage which extends inwardly from an exterior face thereof. Surrounding the outer end of the flow passage is a counterbore which is sized to closely receive the end of the tubing to be joined with the fitting. A tapered camming mouth is formed about the outer end of the counterbore. Positioned about the tube for cooperation with the camming mouth is a first ferrule having a central opening to closely receive the end of the tube. An outer surface of the first ferrule is engageable with the camming mouth and is adapted to be cammed radially inwardly upon movement of the ferrule into the camming mouth. A second ferrule is also positioned on the tube and is located outwardly of the first ferrule. The second ferrule has a nose portion with an internal diameter less than the outer diameter of the tube. The nose portion is engaged with a groove preformed into the exterior of the tube prior to make-up of the tube fitting. Surfaces formed on the forward end of the second ferrule and the rear surface of the first ferrule cooperate to produce radial inward movement of the nose portion of the second ferrule when the second ferrule is driven axially toward the first ferrule. Fitting nut means are threaded to the fitting body and enclose the first and second ferrule members. The nut means are operable to produce driving movement of the ferrules into the camming mouth to produce radial inward movement of the ferrules while simultaneously driving the tube into the counterbore.

Preferably, and in accordance with a more limited aspect of the invention, the nut means cooperates with the fitting body to define a chamber which encloses the first and second ferrules. The total volume of the ferrules is substantially equal to the volume of the chamber when the fitting is in a made-up condition.

In accordance with a still further aspect of the invention, the nut means and the fitting body include externally visible stop and alignment surfaces which come into engagement upon proper make-up of the fitting. This arrangement reduces the likelihood that the fitting will be overtightened and provides a quick visual indication of proper fitting make-up. When used in conjunction with the controlled ferrule space or chamber, proper make-up is assured and the tube is always engaged with a predetermined amount of ferrule contact and pressure. Moreover, because the second or rear ferrule is snapped fitted into a preformed groove prior to make-up, tightening of the fitting nut produces positive predetermined movement of the second ferrule and tubing into the camming mouth. Slippage between the ferrules and the tubing is not possible.

Accordingly, a primary object of the subject invention is the provision of a tube fitting particularly intended for plastic tubing and designed so that proper fitting make-up is assured.

A still further object is the provision of a fitting of the type described wherein the pressure sealing and tube holding ferrules are positively driven together with the tube into a final located position which cannot vary irrespective of tube or ferrule lubricity or the like.

Yet another object is the provision of the fitting of the type described wherein the ferrules are confined in a chamber having a predetermined volume which is only slightly larger than the total volume of the ferrule so that cold flow of the ferrule material cannot take place after the fitting is properly made-up.

Yet another object of the invention is the provision of a fitting of the type described wherein the sealing and holding functions are subdivided between two separate ferrule elements which are positively driven to a desired final made-up position so that total uniformity in sealing and gripping pressure is achieved.

Still another object is the provision of tube fitting of the type wherein the tube is snap fit into the fitting to provide both sound and tactile indication of proper assembly.

Another object or advantage is the provision of a fitting in which the fully assembled position is indicated by both closure of an externally visible gap and alignment of externally visible hexagonal surfaces.

An additional advantage is the provision of a tube fitting of the type described wherein the tubing ends can be manually inserted into the loosely assembled fitting.

BRIEF DESCRIPTION OF THE DRAWINGS

The above and other objects and advantages of the invention will become apparent from the following description when read in conjunction with the accompanying drawings wherein.

DETAILED DESCRIPTION OF THE PREFERRED EMBODIMENT

Figure 1:
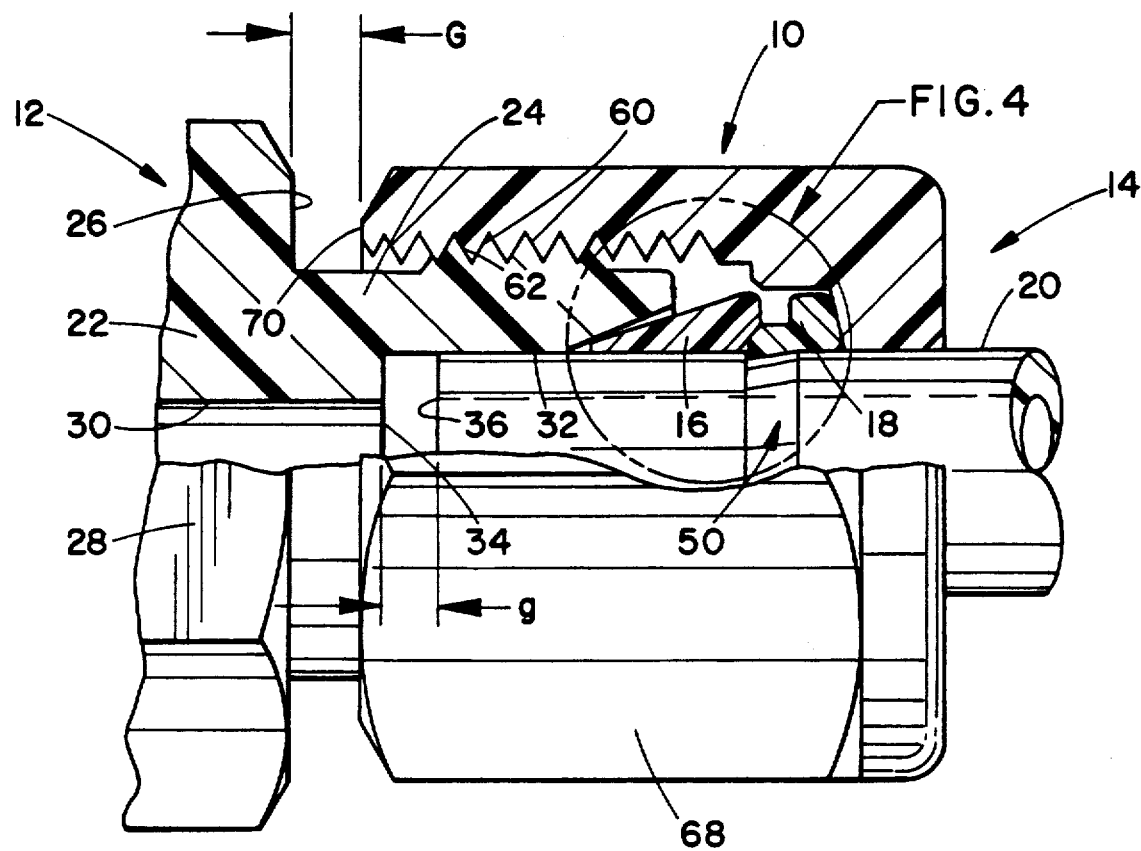
FIG. 1 is a side elevational view partially in cross-section showing a fitting formed in accordance with the preferred embodiment of the invention (In FIG. 1 the components are shown in a "finger-tight" assembled relationship prior to the final tightening and "make-up" of the fitting)
Figure 4:
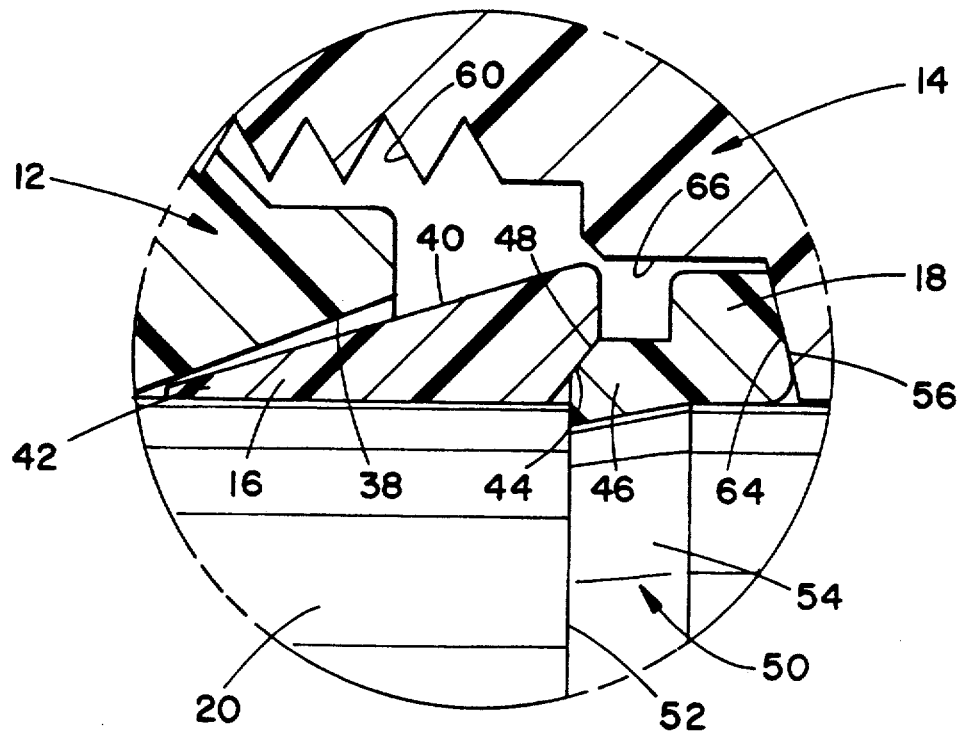

Referring more particularly to the drawings wherein the showings are for the purpose of illustrating a preferred embodiment of the invention only, and not for the purpose of limiting same, FIGS. 1 and 4 generally show the overall arrangement of a tube fitting 10 which is particularly intended for use on resinous plastic tubing or other tubing having a degree of plasticity and relatively high lubricity. While the tube fitting 10 could have a variety of specific configurations, it is shown generally as comprising a main, male body component 12 and a female nut component 14 which cooperate to confine first and second ferrule members 16 and 18 into position about a tube 20. Preferably, and in accordance with the preferred embodiment of the invention, the body component 12 is molded from a suitable resinous plastic material such as PFA (perfluoroalkylvinylether), tetrafluoroethylene or nylon. The body component 12 comprises a main body section 22 and an outwardly extending portion 24. A radially extending, circumferentially continuous shoulder 26 is formed at the junction between the main body section 22 and the outwardly extending portion 24. It should be appreciated that the main body section 22 could be part of a standard fitting, or it could be part of an associated structure such as a valve or the like. Preferably, the portion of the main body section 22 which is adjacent the reduced diameter portion 24 is provided with a generally hexagonal configuration to provide wrench flats 28.

Extending axially inwardly from the outer end of the reduced diameter portion 24 is a flow passageway 30 which has a cylindrical configuration and is of a diameter slightly less than the outer diameter of the tube 20 to which the fitting assembly is to be connected. A counterbore 32 is formed at the outer end of the passage 30 and is joined therewith by an end wall 34 which preferably lies in a plane perpendicular to the axis of passageway 30. The diameter of the counterbore 32 is desirably sized so as to closely but freely receive the end of the tube 20. Additionally, it is preferable for the purposes of the subject invention to have the end wall 36 of the tube cut perpendicular to the axis of the tube.

As best illustrated in FIG. 4, the outermost end of the counterbore 32 is provided with a generally conically shaped or tapered camming mouth 38 which is formed, as illustrated, at a relatively shallow angle relative to the axis of the passageway 30. The ferrule member 16 is arranged to cooperate with the camming mouth 38 such that the ferrule is driven into sealing engagement with the exterior wall of the tube 20 and the surface of the camming mouth 38 during fitting make-up. For this reason, the ferrule member 16 is preferably formed of a suitable resilient plastic material such as PFA tetrafluoroethylene or nylon and has a generally conical exterior surface 40 which is preferably of an angle only slightly less than the angle of the camming mouth 38. This relationship is best shown in FIG. 4 wherein the various components are shown in a finger-tight assembled position. Preferably, the nose portion 42 of the ferrule 16 is relatively blunt or slightly rounded as shown. The rear surface of the ferrule 16 is provided with a conically shaped counterbore or camming mouth portion 44 which, as will subsequently be described, functions to drive the nose portion 46 of the rear ferrule 18 radially inwardly during fitting make-up.

The arrangement of rear ferrule 18 and its relationship to the tube 20 and the front ferrule 16 is particularly important to the subject invention. In this regard, the rear ferrule 18 has the previously mentioned nose portion 46 which has a tapered upper surface 48 adapted to engage the conical camming mouth 44 on the rear of the first or front ferrule 16. In addition, the nose portion 46 has a diameter at its innermost position which is less than the outer diameter of the tube 20. That is, the original, pre-make-up inner diameter of nose portion 46 is significantly less than the outer diameter of tube 20. In addition, the tube 20 is provided with a circumferentially extending recess 50 having the preferred configuration best shown in FIG. 4. More particularly, the forward end of the recess 50 has a circumferentially continuous radially extending wall 52 which is generally perpendicular to the axis of the tube. An inclined or tapered wall or surface 54 extends from the radial innermost portion of the wall 52 to the outer surface of the tube 20. The rear portion of ferrule 18 is relatively thick and heavy and has an inclined outer wall 56.

Figure 2:
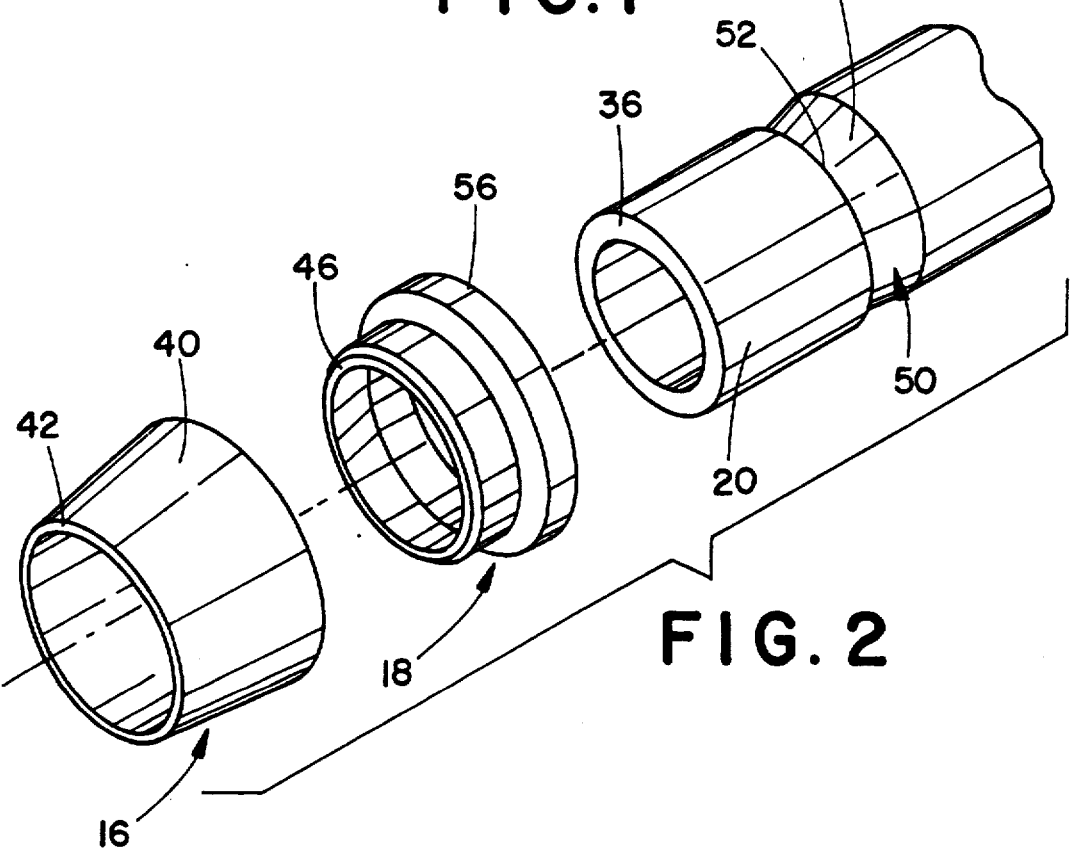
FIG. 2 is an exploded pictorial view showing the tube end and the associated fitting ferrules.

The recess 50 is located a predetermined distance from the end wall 36 of the tube 20. As best shown in FIGS. 1 and 2, it will be seen that the recess 50 is located a distance such that when the fitting is in the finger-tight position a small gap g exists between the end wall 36 of tube 20 and the bottom wall 34 of the counterbore 32. This relationship is selected so that the distance g is slightly less or substantially equal to the distance that the tube is driven axially into the counterbore 32 during make-up.

As previously mentioned, the female nut member 14 acts to drive the ferrules into each other and into the camming mouth 38 during fitting make-up. For this reason, the female nut member 14 is joined to the main body component 12 through cooperating respective threads 60, 62 respectively. Interiorly, the nut member 14 has an end wall 64 which is inclined generally at the same angle as the end wall 56 of the ferrule member 18. This relationship is clearly shown in FIG. 4. Additionally, the nut member 14 has a stepped interior bore with a reduced diameter portion 66 which surrounds the back end of front ferrule 16, as well as ferrule member 18 to limit their outward movement during fitting make-up. Additionally, it should be noted that the diameter of the stepped counterbore 66 s substantially less than the internal diameter of the threads 60. This assures that disassembly can take place without interference between the maximum outer extent of the ferrules 16 and 18 in their final deformed condition and the threads 60.

Figure 3:
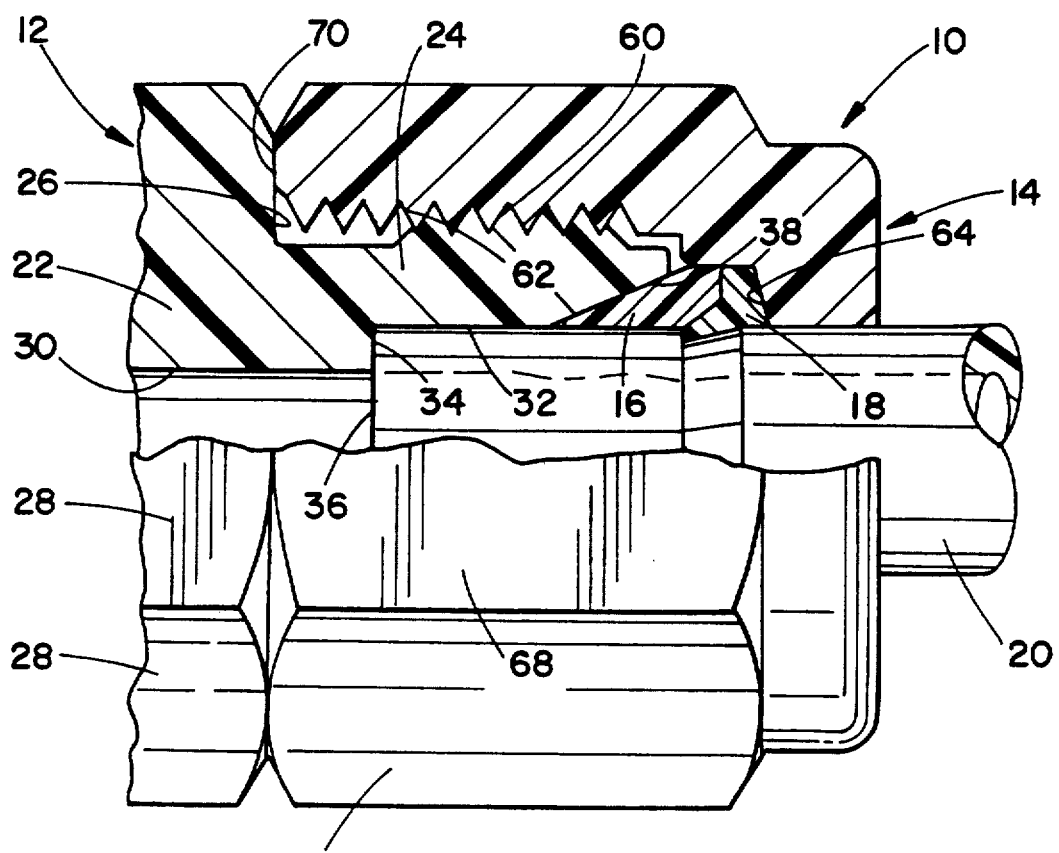
FIG. 3 is a view similar to FIG. 1 but showing the fitting components in a fully tightened, made-up relationship; and, FIG. 4 is an enlarged view of the circled area of FIG. 1.

In order to allow the female nut member 14 to be driven to the final made-up position shown in FIG. 3, the exterior of the nut member is provided with a generally hex-shaped configuration to provide wrench flats 68. Preferably, and in accordance with an aspect of the invention, the hex-shaped configuration on the nut member 14 corresponds to the hex-shaped configuration on the main fitting body 12. The various components of the fitting are dimensioned such that "g" is equal to or slightly less than "G". This assures that when the fitting is fully made-up, tube end 36 bottoms against wall 34 as wall 70 engages wall 26. This engaged relationship is shown in FIG. 3 which represents the fitting in a final made-up condition. As the fitting is being made-up, the tubing and the ferrules are driven inwardly. The positive engagement between the ferrule 18 and the recess 50 which results from the actual snap engagement between the ferrule and the recess during preliminary assembly prior to make-up assures that the tubing and the ferrules are driven into their final located position without slippage between any of the components. Additionally, the final made-up position of the components is apparent by the engagement of the two radially extending surfaces 26, 70 on the main fitting body 12 and the nut member 14, respectively. A further visual indication of proper make-up is provided by virtue of the location of the hex surfaces 28, 68 respectively. That is, these surfaces are related to the threads and the surfaces 26, 70, such that at make-up and simultaneously with engagement of the surfaces 26, 70, the hex surfaces 28, 68 are in exact alignment as illustrated in FIG. 3. That is, the peaks of the respective hex-shapes are aligned.

In accordance with a further aspect of the invention, the total space enclosed by the conical surface or camming mouth 38 and the counterbore 66 in the female nut 14 is substantially equal to the total volume of the ferrule members 16 and 18. This relationship is illustrated in FIG. 3. Note that when in the full made-up condition, the ferrules 16, 18 are totally enclosed in a chamber defined by the body component 12, the nut member 14 and the tube 20. Because of this relationship, there is no available space into which cold flow of the ferrules can take place. This assures that the compression sealing forces generated within the ferrules during make-up are maintained throughout the assembled life of the fitting.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

What is claimed is:

1. A tube fitting for joining resinous plastic tubing and comprising:
   a body member having a tube receiving opening with a conically shaped camming mouth facing outwardly of said opening;
   a resinous plastic tube closely received in said opening;
   a first ferrule member slidably received on said tube and having an exterior surface which faces said camming mouth and has a conical shape generally corresponding to the shape of said camming mouth;
   a second ferrule member slidably received on said tube at a location outwardly of said opening and said first ferrule, said second ferrule member having a nose portion which engages the first ferrule adjacent said tube, said nose portion being circumferentially continuous about said tube;
   said tube including a recess formed circumferentially thereof prior to association of said tube with said fitting, the location of said recess corresponding to the predetermined desired axial location of the nose portion of said second ferrule when said fitting is in a made-up condition;
   said nose portion of said second ferrule encircling said tube and being snap engaged in said recess in axial driving engagement with said tube prior to make-up of said fitting;
   nut means threadedly engaged with said body for driving said first ferrule into said camming mouth and said second ferrule against said first ferrule; and,
   each of said first and second ferrules being formed of a resinous plastic material, with said second ferrule having an original pre-make-up internal diameter adjacent said nose portion which is less than the external diameter of said tube, said second ferrule being interference fitted on said tube with said nose portion snap engaged in said recess prior to original make-up of said fitting on said tube.

2. A fitting as defined in claim 1 wherein said nut means and said body member have externally visible stop surfaces which come into engagement when said fitting is properly made-up.

3. A tube fitting as defined in claim 1 wherein said nut means is threadedly engaged with the exterior of said body and cooperating therewith to define a chamber which encloses said first and second ferrules, the total volume of said ferrules being substantially equal to the volume of said chamber when said fitting is in a made-up condition.

4. A tube fitting as defined in claim 3 wherein said first ferrule includes a conical camming surface engaging the nose portion of said second ferrule for driving said nose portion radially inward when said second ferrule is moved toward said first ferrule during make-up of said fitting.

5. A tube fitting as defined in claim 3 wherein said tube receiving opening terminates in a transversely extending end wall located to define a limit of inward movement of said tube during make-up of said fitting.

6. A tube fitting as defined in claim 5 wherein said end wall of said tube receiving opening is located to be engaged by the end of said tube prior to completion of make-up of said fitting.

7. A tube fitting as defined in claim 5 wherein said nut means and said body have externally visible stop surfaces which come into engagement when said fitting is properly made-up.

8. A tube fitting as defined in claim 5 wherein said nut means and said body each have externally visible wrench surfaces which come into alignment when said stop surfaces come into engagement.

* * * * *